No. 118,845. J. W. Congdon.
Broom Tying Machine.
Patented Sep. 12, 1871.

Witnesses:

J. W. Congdon
Inventor.

UNITED STATES PATENT OFFICE.

JAMES W. CONGDON, OF MARIETTA, OHIO, ASSIGNOR TO F. A. WHEELER, OF SAME PLACE.

IMPROVEMENT IN BROOM-TYING MACHINES.

Specification forming part of Letters Patent No. 118,845, dated September 12, 1871.

*To all whom it may concern:*

Be it known that I, JAMES W. CONGDON, of Marietta, in the county of Washington and State of Ohio, have invented certain Improvements in Machines for Attaching Brooms and Brushes to their Handles; and I do hereby declare that the following is a full, clear, and exact description thereof, reference being had to the annexed drawing making a part of this specification, in which—

Figure 1:
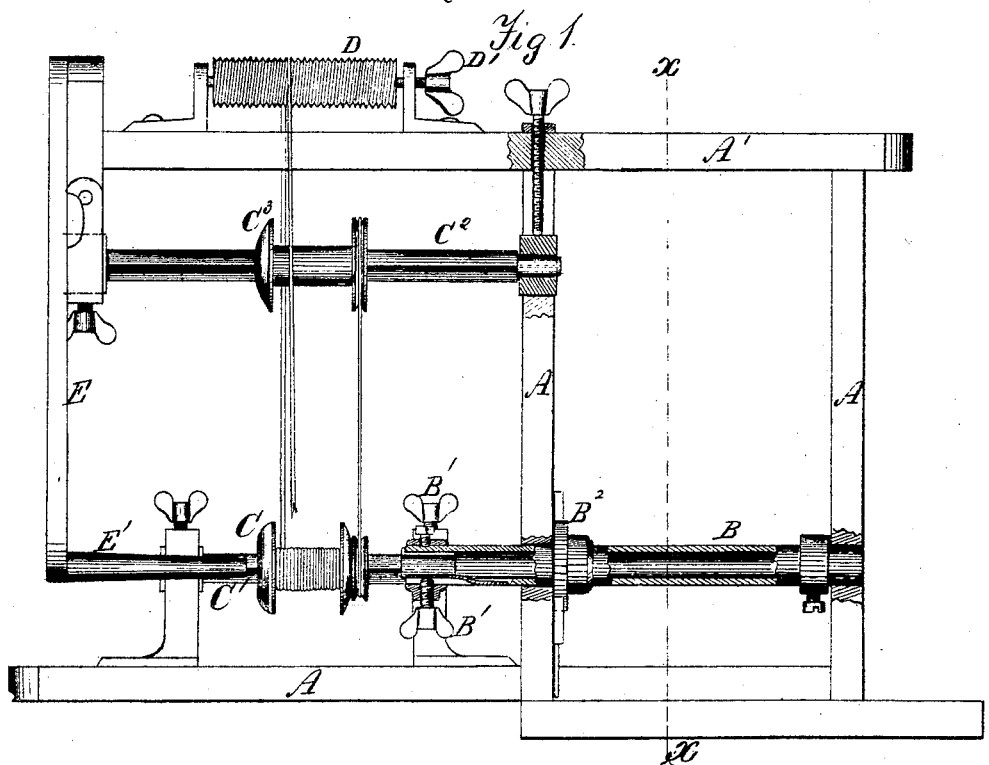
Figure 2:
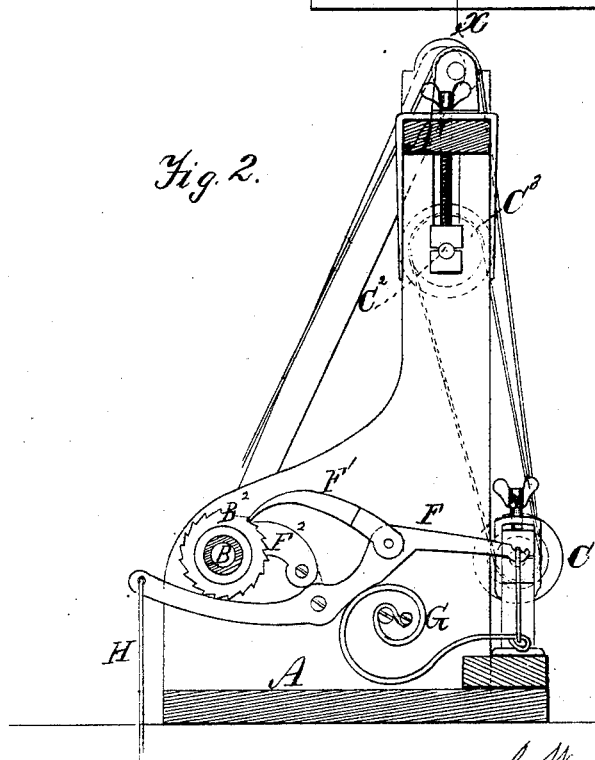

Figure 1 is a side elevation of my improved machine, partly in section, showing the frame, the spools upon which the wire or twine is wound, the guide-roller, the hollow shaft into which the handle of the broom is inserted, and a device for holding brushes while receiving the bristles. Fig. 2 is a sectional elevation on line $x\ x$ of Fig. 1, showing the positions of the spools, the twine, and wire, and the mechanism for rotating the broom or brush.

Corresponding letters refer to corresponding parts in both figures.

This invention relates to a machine for fastening the corn of brooms and the bristles of brushes to their handles, the novel features of which will be more fully described hereinafter.

In constructing machines of this character a frame-work of wood or other suitable material is to be erected, of the form shown in the drawing or in any other form which will adapt it to the reception of the operating parts of the mechanism. To receive and hold the handle while the brush or corn is being attached thereto a hollow shaft, B, is fixed in a horizontal position in bearings formed in or upon the frame A, its outer end being provided with a collar through which a thumb-screw, B', passes, which is made to press upon a spring also inserted in the end of the shaft, and which, in consequence of the force applied to it by the thumb-screw, acts upon the handle, and prevents its turning in the shaft, or, rather, compels it to turn with such shaft. For holding the wire or twine with which the brush or corn is to be secured to the handle, a spool, C, is mounted upon a shaft, $C^1$, which has its bearings in boxes which are placed in pedestals attached to arms or levers which constitute a portion of frame A. This shaft may be square in form, and have journals formed upon its ends, or it may be round throughout its entire length, and have a feather inserted in a spline formed therein. In either case the spool is not to be allowed to rotate upon the shaft, but is free to move longitudinally thereon, in order that it may always be kept opposite to or in line with that portion of the broom upon which the wire or twine is being wound. The boxes of this shaft are provided with set-screws, by which means any required amount of resistance may be offered to the unwinding of the wire from the spool, and consequently it may be wound upon the broom or brush with any desired amount of tension. As a matter of convenience, another shaft, $C^2$, is shown, which has its bearings in boxes attached to the frame A, and is provided with set-screws, as is the one above described. This shaft may be constructed in all respects like the one $C^1$, or it may be longer or shorter, it being supplied with a spool for the reception of twine when the other is covered with wire, and with a crank upon its outer end for the purpose of rotating it when wire or twine is to be wound upon its spool, or upon the spool upon shaft $C^1$, motion to which may be communicated by means of a belt, as shown in the drawing, which belt need not be used when the unwinding process is going on from either of the spools.

This last-named shaft may, if preferred, be dispensed with, and the crank be applied to the lower shaft, or the one $C^1$ may be dispensed with and $C^2$ be used.

For guiding the wire or twine to the broom or brush a screw-threaded roller, D, is placed upon the upper portion of the frame A, where it is held by pointed pins or screws which enter cavities in its ends, one of such points being adjustable so that the required amount of friction may be applied to it. Upon the surface of this roller a thread is formed, the pitch of which will cause the spaces between its threads to be such a distance apart as it is desirable to have the wire or twine as it is wound upon the broom or brush. The spool being placed under or by the side of this roller, and so that as the operation of unwinding the wire therefrom commences it shall be placed at one end of the roller, it follows that as the wire or twine passes over it, its position upon the broom or brush will be determined.

The description thus far given relates to the machine when used for making brooms; but in order that it may be adapted for making brushes I attach an arm, E, to the frame A, in such a position that it shall extend downward far enough to allow a piece, E', to be inserted in its lower end, which shall project inward toward the end of shaft B, its inner end being provided with a socket or recess into which to insert the end of a brush-handle, its opposite end being placed in and held by the shaft B, while the bristles or other materials of which it is in part made are being secured by the wire or twine.

In order that the necessary rotary motion may be given to the handle of the broom or brush while the other parts are being applied, a ratchet-wheel, $B^2$, is placed upon shaft B in such a position that a lever, F, may be attached or pivoted to the frame A, and have pivoted to it a dog, $F^1$, which shall engage with the teeth of the ratchet-wheel, and thus cause a partial rotation of the shaft each time that the outer end of the lever is borne down by the rod or rope H, which may be attached to any suitable crank or treadle, the lever being returned to its first position by means of the spring G which acts upon its opposite end, as shown in Fig. 2. To prevent the shaft B from being turned in the wrong direction a dog, $F^2$, is pivoted to the frame A, and made to engage the teeth of wheel $B^2$ while the lever F is being thrown back by the spring G, preparatory to giving further movement to the shaft B.

What I claim as my invention, and desire to secure by Letters Patent, is—

1. In combination with the frame A, the hollow shaft B and the spool C arranged to slide upon the revolving shaft $C^1$, substantially as and for the purpose set forth.

2. The combination, with the frame A, of the spool or spools arranged to slide upon their respective revolving shafts and the revolving threaded guide-roller, substantially as and for the purpose set forth.

3. In combination with the frame of a broom-tying or fastening-machine, and with its hollow shaft, the arm E E', substantially as and for the purpose set forth.

In testimony whereof I have signed my name to this specification in the presence of two subscribing witnesses.

JAMES W. CONGDON.

Witnesses:
J. W. WHITE,
SAML. S. KNOWLES.